Feb. 15, 1966   F. P. MORAWSKI ET AL   3,235,104
APPARATUS FOR LOADING CARS
Filed May 10, 1963   4 Sheets-Sheet 1
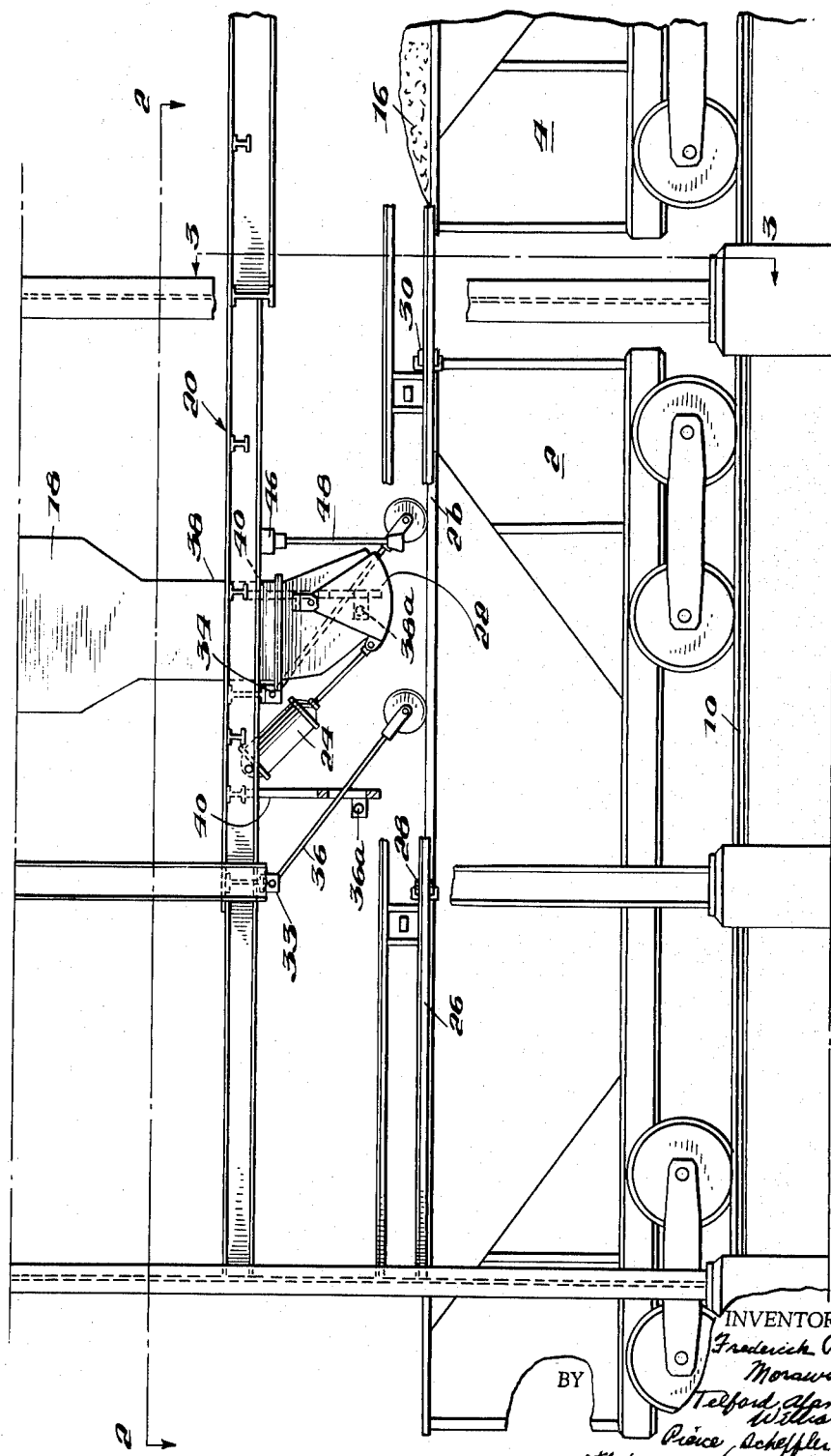

Feb. 15, 1966  F. P. MORAWSKI ET AL  3,235,104
APPARATUS FOR LOADING CARS
Filed May 10, 1963  4 Sheets-Sheet 2
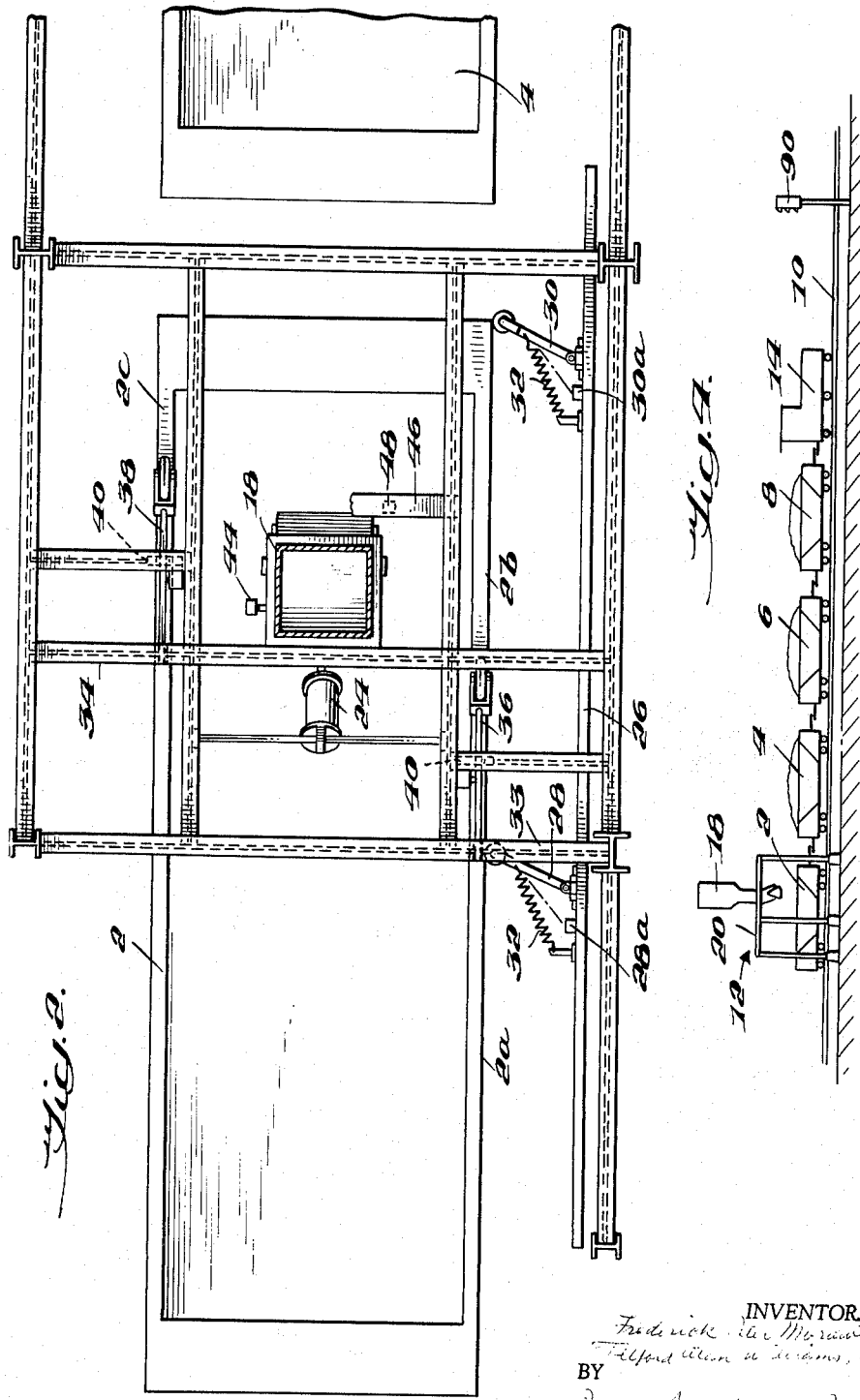
INVENTORS

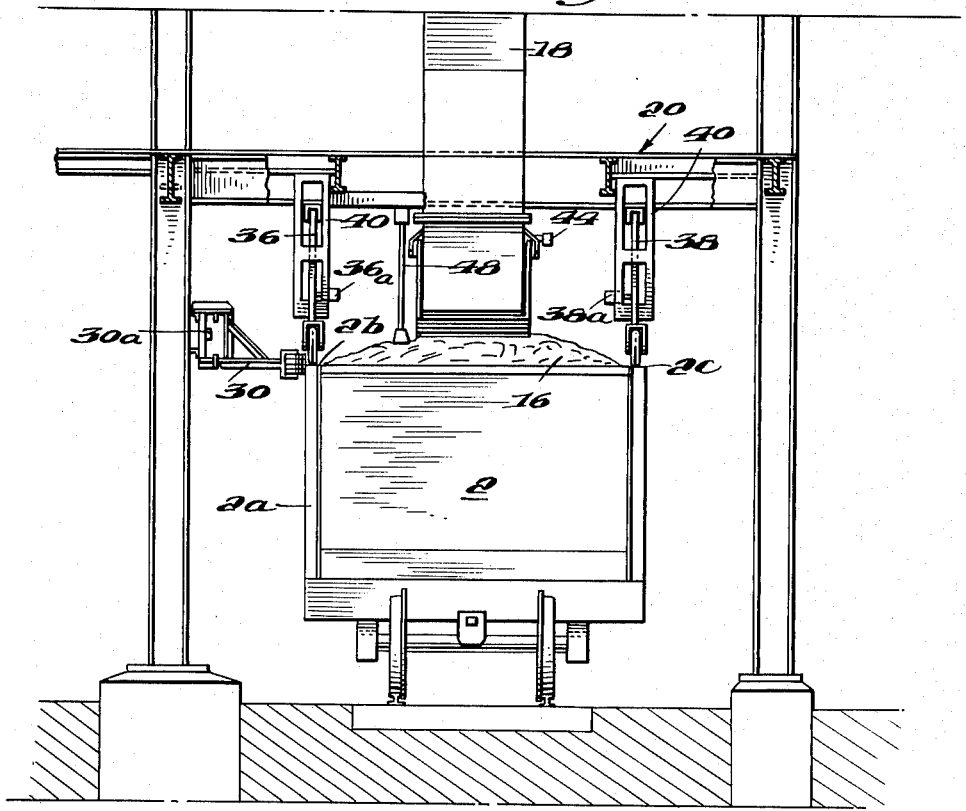
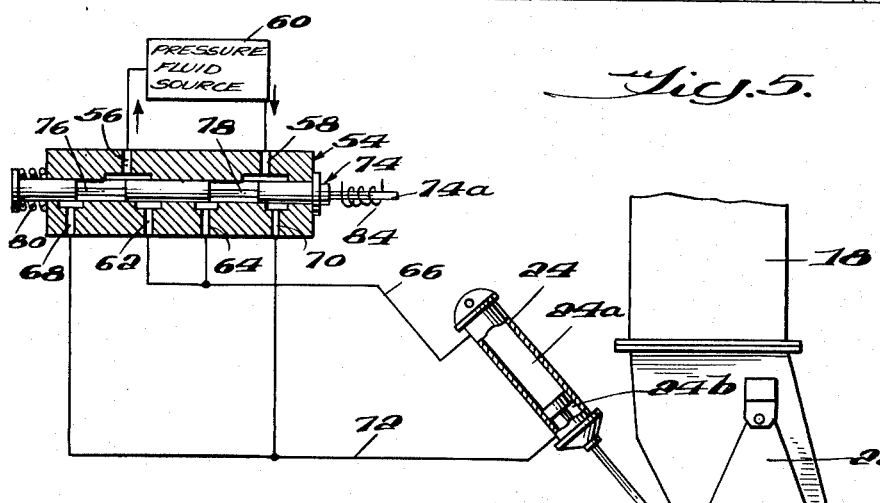

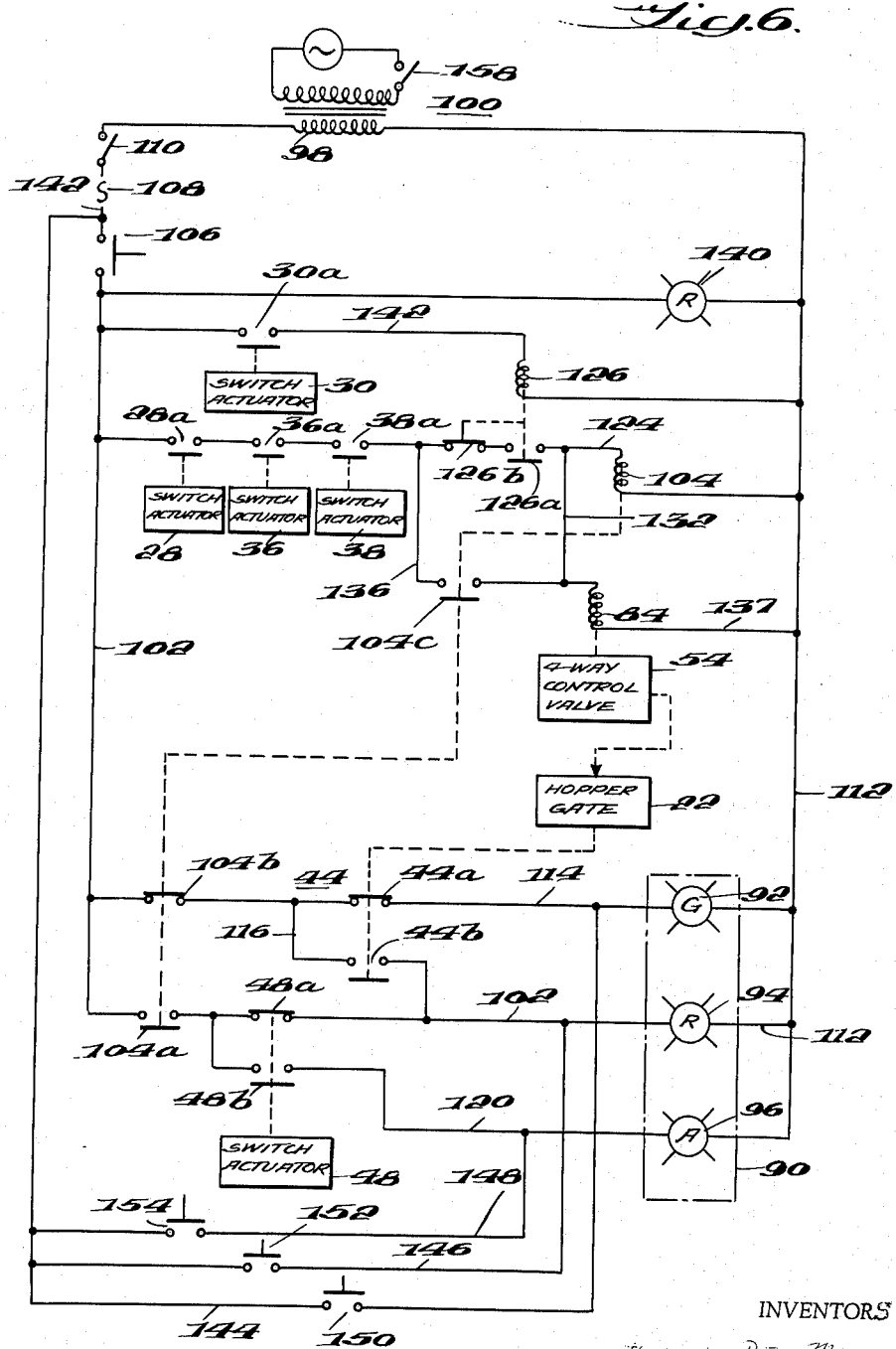

United States Patent Office 3,235,104
Patented Feb. 15, 1966

3,235,104
APPARATUS FOR LOADING CARS
Frederick Peter Morawski, Aurora, and Telford Alan Williams Sr., Hoyt Lakes, Minn., assignors to Erie Mining Company, Hibbing, Minn., a corporation of Minnesota
Filed May 10, 1963, Ser. No. 279,518
2 Claims. (Cl. 214—42)

This invention relates generally to vehicle loading apparatus, and more particularly to apparatus for loading a train of open-topped freight cars, e.g., gondola cars, with fluent solid material, said apparatus preferably comprising discharge control means automatically operated by successive cars of the train, and remotely located signalling means for advising the operator in charge of the movement of the train of the position of the discharge control means as well as the condition and location of a given car relative to the loading apparatus.

In the loading of a conventional type of bottom-dump open-topped freight car with ore pellets and the like, an operator is normally stationed at the loading bins for controlling the discharge of material into the cars and for causing the train to move forwardly to position an empty car beneath the loading apparatus. The expense of maintaining an operator at the loading site increases the overall cost of the loading operation, and often a fatigued or inexperienced operator has difficulty in filling successive cars to the desired height without spilling the material. The present invention was developed to avoid the above and other drawbacks of the known car loading devices.

While in the following description the invention will be described with specific reference to the loading of a train of gondola cars, it is to be understood that the invention is applicable to the loading of any suitable open-topped wheeled receptacles adapted to be moved to, and into loading relationship with respect to, and away from, a means for discharging fluent solid material from a container.

A primary object of the present invention is to provide an automatic loading system which eliminates the necessity of a bin operator and permits uniform loading of a train of cars, of the above-described type, solely by the operator in charge of the movement of the train.

A more specific object of the invention is to provide an automatic car loading apparatus including position responsive means for opening a discharge control member of a bin or hopper when a given car is correctly positioned therebeneath, and remotely located signalling means for advising the operator in charge of the train whether or not the car is in the loading position and whether the discharge control member is in an open or closed position.

A further object of the invention is to provide car loading apparatus including remotely-located signalling means for advising the operator of the position of a car relative to the loading apparatus, the position of the discharge control member of the loading apparatus, and whether or not the car has been filled with material to a given height. By the use of these signalling means—in combination with the aforementioned position-responsive means for operating the discharge control member—the operator may uniformly fill the various cars of a train with material to a desired height. The invention affords the additional advantage that an experienced operator may fill a string of cars without completely stopping the train, and consequently the time required for loading the train is appreciably reduced. Because of the uniform loading obtained by the invention, an average higher load may be carried by each car, and since none of the cars is overloaded, the loss of material during transit is minimized. Owing to the arrangement of the various actuators of the position-responsive means, the spillage which normally occurs between cars during loading is eliminated.

Other objects and advantages of the invention will become apparent from a study of the following specification when considered in conjunction with the accompanying drawing, in which:

FIG. 1 is an elevational view, with certain parts broken away or omitted for the sake of clarity, of the car loading apparatus;

FIG. 2 is a horizontal sectional view taken along line 2—2 of FIG. 1;

FIG. 3 is a vertical sectional view taken along line 3—3 of FIG. 1;

FIG. 4 is a diagrammatic illustration of the arrangement of the signal indicating means relative to the car loading apparatus; and FIGS. 5 and 6 are schematic diagrams of the pressure fluid and electrical systems, respectively, for operating the hopper gate and the signal indicating means.

Referring first more particularly to FIGS. 1–4, a plurality of gondola cars 2, 4, 6 and 8 are transported along track 10 beneath stationary loading apparatus 12 by a track-mobile or locomotive 14. Loading apparatus 12 includes a hopper 18 supported over the path of travel of the cars by a rigid I-beam frame 20. The gravity discharge of bulk fluent solids (for example, pellets, coal, ore, gravel or the like) from the hopper into the cars is controlled by a pivotally movable arc gate 22. Arc gate 22 is operable between closed and open positions by piston motor 24 the cylinder of which is pivotally connected to frame 20.

Pivotally connected to longitudinal frame member 26 are two longitudinally-spaced switch actuators 28 and 30 which control the operation of switches 28a and 30a, respectively (see FIG. 6). Actuators 28 and 30, which are pivotaly movable in a horizontal plane, are biased by springs 32 toward "open-switch" positions normal to frame member 26. The actuators are arranged to be pivoted by a side wall of a passing gondola car to "closed-switch" positions as shown in FIG. 2.

Pivotally connected to longitudinally-spaced transverse members 33 and 34 of frame 20 are two additional switch actuators 36 and 38, respectively. These actuators pivot vertically between vertical guides 40 and control the operation of switches 36a and 38a, respectively. The actuators are biased downwardly by gravity toward "openswitch" positions and are arranged to be pivoted upwardly to "closed-switch" positions by the upper surfaces of opposite side walls of a gondola car as shown in FIG. 1.

A further switch 44 is secured to hopper 18 for actuation by gate 22. As will be described below, switch 44 includes first and second sets of switch contacts 44a and 44b which are closed and open, respectively, when gate 22 is closed, and which are open and closed, respectively, when gate 22 is open.

Susupended from transverse beam 46 of frame 20 is a level-sensing switch actuator 48. The lower extremity of actuator 48 is positioned at a height corresponding to the level to which the car is to be filled. Actuator 48 controls the operation of two sets of switch contacts 48a and 48b. When the level of material 16 in the car is below the desired height, contacts 48a and 48b are closed and open, respectively. When the level of material in the car reaches the desired height, actuator 48 is operated to open and close switch contacts 48a and 48b, respectively.

Referring now to FIG. 5, the operation of piston motor 24 is controlled by 4-way solenoid valve 54 having a first pair of ports 56 and 58 connected to the low and high pressure sides of a pressure fluid source 60. Valve 54 includes a second pair of ports 62 and 64 connected to one end of motor 24 via conduit 66, and a second pair of ports 68 and 70 connected to the other end of the motor via conduit 72. Slide plunger 74 containing grooves 76 and 78, is biased to the left toward the illustrated position by spring 80. In this position pressure fluid is supplied to expansible chamber 24a of the piston motor via port 58, groove 78, port 64 and conduit 66. Chamber 24b is connected to low pressure return via conduit 72, port 68, groove 76 and port 56. The piston of motor 24 is extended and maintains hopper gate 22 in the closed (FIG. 5) position. Solenoid winding 84 is associated with plunger extension 74a and is operable, when energized, to shift plunger 74 to the right to a position in which chamber 24b is supplied with pressure fluid via port 58, groove 78, port 70 and conduit 72, and chamber 24a is connected with low pressure return via conduit 66, port 62, groove 76 and port 56. When plunger 74 is in this latter position, the pressure in chamber 24b is greater than that of chamber 24a, whereby the piston is retracted to open gate 22.

While a pneumatic control circuit has been described in the above paragraphs, it will be understood, by one skilled in the art, that such pneumatic systems readily might be replaced by an hydraulic control system or by an electronically controlled system.

Referring now to FIGS. 4 and 6, remotely located signal light means 90 are provided for advising the operator of the train whether or not a given car is properly positioned beneath hopper 18, whether or not gate 22 is open, and whether or not the material in the car is at the predetermined level. The signal light means, which are spaced some distance from the loading apparatus in the direction of travel of the train, include green, red and amber lights 92, 94 and 96, respectively. One terminal of red light 94 is connected to one end of the secondary winding 98 of power transformer 100 by conductor 102 which includes normally-closed switch 48a, normally-open switch 104a, selector switch 106, fuse 108 and start switch 110. The other terminals of red light 94 and winding 98 are connected by conductor 112. Green light 92 is connected between conductors 102 and 112 by conductor 114 which includes normally-closed switches 44a and 104b. Jumper conductor 116, which includes switch 44b, is connected at one end to conductor 114 between switches 104b and 44a, and at the other end to conductor 102 between switch 48a and red light 94. Amber light 96 is connected in parallel with red light 94 and switch 48a by conductor 120 which includes switch 48b.

Relay 104, which controls the operation of relay switches 104a, 104b and 104c, is connected across conductors 102 and 112 by conductor 124 which includes a normally-open switch 126a, normally-closed switch 126b and normally-open switches 28a, 36a and 38a. Device 126 is an electrical relay and includes, as an integral part thereof, a small pneumatic time delay unit. Such pneumatic timing relays are described and illustrated on pages 1–4 of Bulletin 10337 (January, 1952) of Cutler-Hammer, Inc. One end of the solenoid winding 84 of valve 54 is connected, by conductor 132, to conductor 124 between switch 126a and relay 104. This end of the solenoid winding is also connected, by holding-circuit conductor 136 including normally-open switch 104c, to conductor 124 between switches 38a and 126b. The other end of solenoid 84 is connected to conductor 112 by conductor 137. Indicating light 140 is connected across condutors 102 and 112, and relay winding 126 (which operates switch 126a) is connected across conductors 102 and 112 by a conductor 142 which includes switch 30a.

In order to provide manual override of the signal light control, junction 142 (between fuse 108 and switch 106) is connected to conductors 114, 102 and 120 by shunting conductors 144, 146 and 148 containing push button switches 150, 152 and 154, respectively. Switch 158 controls the supply of A.-C. energy to the primary winding of transformer 100.

Operation

Assume that gondola cars 4, 6 and 8 have been filled and the operator in locomotive 14 desires to fill the last car 2 with a given height of bulk material. Assume further that switches 158, 110 and 106 are closed, and that the remaining switches are in their illustrated normal positions.

Since switches 104b and 44a are closed, green light 92 is energized (via conductors 102, 114 and 112) and advises the operator of the train to move the train forwardly. As car 2 is progressively introduced within the hopper frame 20, actuators 28, 36 and 38 are successively engaged by the car to cause successive closing of switches 28a, 36a and 38a. When the car is directly beneath hopper 18, actuator 30 is engaged by the forward end of the car to close switch 30a, whereby relay winding 126 is energized to close switch 126a. Upon closing of switch 126a relay 104 and solenoid 84 are energized simultaneously. Energization of relay 104 causes closing of switch 104c (to establish a holding circuit across switches 126b and 126a), opening of switch 104b (to de-energize green light 92), and closing of switch 104a (to energize red light 94). Energization of solenoid 84 causes plunger 74 to be shifted to the right from its FIG. 5 position, whereby piston motor 24 is operated to open gate 22. Opening of gate 22 causes opening of switch 44a and closing of switch 44b. Since the car is initially empty, switch 48a remains closed. The operator is advised by the energized red light that car 2 is in the loading position. The operator slows down (or, if desired, stops) the train during loading. Switch 126b opens after the predetermined time delay period, and relay 104 and solenoid winding 84 remain energized via holding circuit switch 104c.

As the level of discharged material increases to a predetermined height in car 2, actuator 48 is operated to open switch 48a and close switch 48b, whereby red light 94 is de-energized and amber light 96 is energized, thus advising the operator to increase speed (or to transport car 2 forwardly if the train was stopped). As car 2 is moved from beneath the hopper 18, actuator 28 no longer engages the car and is operated to open switch 28a, whereby windings 104 and 84 are de-energized. De-energization of relay 104 causes closing of switch 104b (and opening of switches 104a and 104c to de-energize amber light 96) whereby red light 94 is momentarily energized via switches 104b and 44b. As hopper gate 22 closes (owing to the de-energization of solenoid winding 84), switch 44a is closed and switch 44b is opened, whereby the red light is de-energized and the green light is energized (via switches 104b and 44a). The operator is advised to proceed from the loading area. It should be mentioned that if hopper gate 22 should fail to close, red light 94 remains energized via switches 104b and 44a.

The above control scheme can also actuate a conveyor under a hopper, or a reciprocating feeder, or a vibrating feeder, or other type material-handling equipment. Part 84 can be a standard auxiliary electrical relay which closes contacts to energize an electrical starter for any of the feeders just mentioned. Actuation of contacts 44a and 44b can then be accomplished by auxiliary contacts on the feeder starter, or by limit switches, or by any motion-sensing device on either the feeder or the conveyor.

It is important to note that because of the longitudinal spacing of actuators 36 and 38, arc gate 22 is prevented from opening between cars and spillage is avoided. Moreover, if the hopper gate has been indicated as being open and the amber light fails to come on after a reasonable period of time, the operator is advised that the hopper is empty and that the train should be stopped completely. It is apparent that if an additional car were connected behind car 2, the operation described above would be repeated when all of the actuators 28, 36, 38 and 30 are engaged by that car to close switches 28a, 36a, 38a and 30a.

Push button switches 150, 152 and 154 provide manual override means for testing the operability of signal lights 92, 94 and 96, respectively. If desired, linkage means may be provided for manually shifting plunger 74 to override the electrical control of hopper gate 22. Signal light 140 indicates the state of energization of the electric control.

Preferably the control system of FIG. 5 is a pneumatic system, although a hydraulic system or an electronic control system could also be used. Instead of the fluid-operated delay means for opening switch 126b, it is apparent that other types of delay means (for example, resistance-heated thermally-actuated switch means) might also be utilized, if desired.

It is to be understood that the control of the car train movement may be effected by automatic means such as an automatically controlled donkey engine or rope pulley. Such alternatives have not been illustrated in view of the fact that the invention includes the use of any known automatic means of train movement control.

While in accordance with the provisions of the Patent Statutes the preferred embodiment of the invention has been illustrated and described, it will be apparent to those skilled in the art that changes may be made in the disclosed apparatus without deviating from the invention set forth in the following claims.

What is claimed is:

1. Apparatus for loading fluent solid material into open-topped cars of a train moved by an operator-controlled locomotive, comprising a stationary hopper containing a discharge opening arranged for discharge of fluent solid material from said hopper into successive cars of the train;
   a normally closed discharge control member controlling the flow of material through said hopper opening;
   signalling means having a normal first state of operation, a second state of operation and a third state of operation, said signalling means being remotely located relative to said hopper in the direction of travel of the train and visible to such operator throughout the loading of the successive cars of the train;
   motor means operable to displace said discharge control member between its closed and open position;
   actuator means mounted adjacent said hopper and operable by each of said cars in succession, when in a predetermined loading position relative to the hopper, for switching said signalling means to said second state of operation and for operating said motor means to open said discharge control member;
   said actuator means including a plurality of actuators arranged for successive actuation by said car during its transport toward the loading position, said actuator means being operable only when all of the actuators are actuated by the car and without regard to forward movement of said car with respect to said hopper
   means mounted adjacent said hopper and operable in response to the level of material in the car for switching said signalling means from said second to said third state of operation when the level of material in the car is a predetermined height and simultaneously for closing said discharge control member;
   and means responsive to movement of each car, when loaded, away from the hopper for restoring said signalling means to said first state of operation.

2. Apparatus for loading fluent solid material into open-topped cars of a train moved by an operator-controlled locomotive, comprising a stationary hopper containing a discharge opening arranged for discharge of fluent solid material from said hopper into successive cars of the train; a normally closed discharge control member controlling the flow of material through said hopper opening; signalling means having a normal first state of operation, a second state of operation and a third state of operation, said signalling means being remotely located relative to said hopper in the direction of travel of the train and visible to such operator throughout the loading of the successive cars of the train; motor means operable to displace said discharge control member between its closed and open positions; said motor means comprises a source of pressure fluid, a reversible fluid operated motor, and solenoid-operated valve means connecting said motor with said source, said valve means having de-energized and energized conditions for operating said motor to place said discharge control member in said closed and open positions, respectively; actuator means mounted adjacent said hopper and operable by each of said cars in succession, when in a predetermined loading position relative to the hopper, for switching said signalling means to said second state of operation and for operating said motor means to open said discharge control member; means mounted adjacent said hopper and operable in response to the level of material in the car for switching said signalling means from said second to said third state of operation when the level of material in the car is a predetermined height and simultaneously for closing said discharge control member; and means responsive to movement of each car, when loaded, away from the hopper for restoring said signalling means to said first state of operation; said apparatus further including electric circuit means operable by said actuator means for simultaneously energizing said solenoid-controlled valve for switching said signalling means to its second state of operation, and time delay switch means for de-energizing said solenoid-controlled valve means after a predetermined time, and holding circuit switch means operable by said actuator means for removing the control of said time delay switch means over said valve means.

References Cited by the Examiner

UNITED STATES PATENTS

| | | | |
|---|---|---|---|
| 2,788,134 | 4/1957 | Miller et al. | 214—42 |
| 2,932,414 | 4/1960 | Fath et al. | 214—18 |
| 2,962,172 | 11/1960 | Fath et al. | 214—17.62 |
| 3,002,637 | 10/1961 | Miller. | |

HUGO O. SCHULZ, *Primary Examiner.*

GERALD M. FORLENZA, *Examiner.*

UNITED STATES PATENT OFFICE
CERTIFICATE OF CORRECTION

Patent No. 3,235,104                         February 15, 1966

Frederick Peter Morawski et al.

It is hereby certified that error appears in the above numbered patent requiring correction and that the said Letters Patent should read as corrected below.

Column 6, line 44, after "valve" insert -- and --.

Signed and sealed this 10th day of January 1967.

(SEAL)
Attest:

ERNEST W. SWIDER                         EDWARD J. BRENNER
Attesting Officer                               Commissioner of Patents